United States Patent [19]

Nichols

[11] Patent Number: 5,076,461
[45] Date of Patent: Dec. 31, 1991

[54] GUARD FOR CASSETTE PLAYER

[75] Inventor: Khipra Nichols, Rumford, R.I.

[73] Assignee: Playskool Baby, Inc., Pawtucket, R.I.

[21] Appl. No.: 591,362

[22] Filed: Oct. 1, 1990

[51] Int. Cl.⁵ .............................................. B65D 43/04
[52] U.S. Cl. ................................... 220/352; 220/306; 70/58; 292/DIG. 38
[58] Field of Search ............... 220/352, 233, 307, 356, 220/DIG. 20; 70/58, 169, 14; 292/19, 80, 91, DIG. 38; 360/137

[56] References Cited

U.S. PATENT DOCUMENTS

| | | | |
|---|---|---|---|
| 1,844,053 | 2/1932 | Beatty | 292/80 X |
| 2,521,098 | 9/1950 | Sebell | 220/352 X |
| 2,565,636 | 8/1951 | Tinnerman | 292/80 X |
| 3,015,682 | 1/1962 | Cheske | 220/307 X |
| 3,064,550 | 11/1962 | O'Day et al. | 292/91 X |
| 3,082,903 | 3/1963 | Stevens et al. | 220/352 X |
| 3,212,416 | 10/1965 | Boersma | 220/352 X |
| 3,941,300 | 3/1976 | Troth | 220/307 X |
| 4,248,345 | 2/1981 | Bowers | 220/307 X |
| 4,446,986 | 5/1984 | Bowen et al. | 220/307 |
| 4,463,870 | 8/1984 | Coburn, Jr. et al. | 220/307 |
| 4,527,405 | 7/1985 | Renick et al. . | |
| 4,616,490 | 10/1986 | Robbins . | |
| 4,629,089 | 10/1986 | Federico et al. . | |
| 4,655,057 | 4/1987 | Derman | 70/14 |
| 4,656,551 | 4/1987 | Gotto . | |
| 4,676,391 | 6/1987 | Peterson | 220/233 |
| 4,741,185 | 5/1988 | Weinert et al. . | |
| 4,832,234 | 3/1989 | Peterson | 220/306 |
| 4,908,728 | 3/1990 | Pinkett | 70/163 X |
| 4,922,734 | 5/1990 | Iannocci | 70/58 |
| 4,940,191 | 7/1990 | Dolby | 220/307 X |
| 4,959,979 | 10/1990 | Filipow et al. | 70/58 |
| 4,964,286 | 10/1990 | Poyer | 70/58 |
| 4,977,762 | 12/1990 | Dennis | 70/14 |
| 4,991,888 | 2/1991 | Cinnamond | 292/296 |

Primary Examiner—Stephen Marcus
Assistant Examiner—Vanessa Caretto
Attorney, Agent, or Firm—Salter & Michaelson

[57] ABSTRACT

A device for child proofing a cassette player includes a front plate portion of elongated rectangular configuration and a pair of clip members which are integrally attached to opposite ends of the plate portion. The clip members are of generally U-shaped configuration and they are receivable in resiliently biased engagement with opposite extremities of a cassette port in a cassette player for releasably securing the front plate portion in obstructing relation with respect to the cassette port.

20 Claims, 2 Drawing Sheets

GUARD FOR CASSETTE PLAYER

BACKGROUND AND SUMMARY OF THE INVENTION

The instant invention relates to cassette players and more particularly to a device for child proofing a cassette player, such as a video cassette recorder, by obstructing the cassette port thereof.

Cassette players and recorders, such as video cassette recorders, have become extremely popular in recent years. However, it has been found that each year a relatively large number of cassette players and recorders are damaged as a result of young children inserting foreign objects, such as food and the like, into the cassette ports thereof. Hence, a significant need has developed for an effective device for child proofing of a cassette recorder or player, such as a video cassette recorder, by obstructing the cassette port thereof.

The device disclosed in the U.S. Pat. to Federico et al No. 4,629,089 generally addresses the problem of child proofing a video cassette recorder by providing a protective housing which limits access to the controls and the cassette port thereof. However, the Federico et al device has been found to be somewhat impractical and ineffective due to its cumbersome size. A variety of other devices have been heretofore available for obstructing the cassette ports of cassette recorders and players, although not necessarily for the purpose of child proofing. These devices which, in addition to the U.S. Pat. to Federico et al, represent the closest prior art to the subject invention of which the applicant is aware, are disclosed in the U.S. Pat. to Renick et al No. 4,527,405; Robbins No. 4,616,490; Derman No. 4,655,057; Gotto No. 4,656,551; and Weinert et and Weinert et al No. 4,741,185. However, the prior art has generally failed to provide an effective device which is releasably receivable in the cassette port of a cassette recorder or player, such as a video cassette recorder, so that it is readily and easily removable from the cassette port by an adult but not by a young child.

The instant invention provides an effective device for child proofing a cassette recorder or player, such as a video cassette recorder. Specifically, the instant invention provides an effective device which is releasably receivable in the cassette port of a cassette recorder or player for preventing a young child from placing foreign objects into the cassette port. Still more specifically, the device of the instant invention is operative in combination with a cassette recorder having a front panel and a substantially rectangular cassette port in the front panel, and it comprises a front obstructing plate which is receivable in obstructing relation with respect to the cassette port, and resilient retaining means which engageable with a pair of opposite extremities of the cassette port for releasably retaining the obstructing means in obstructing relation with respect to the port. The resilient retaining means preferably comprises at least one resilient, generally U-shaped clip member having opposite first and second legs and a connecting portion connecting the first and second legs. The clip member is preferably integrally attached to the obstructing plate so that the first leg of the clip member extends rearwardly therefrom to the connecting portion, and so that the second leg extends forwardly from the connecting portion. The second leg of the clip member is preferably resiliently deflectable toward the first leg for releasably receiving the clip member in pressurized engagement with one of the opposite extremities of the cassette port in order to releasably retain the obstructing plate in obstructing relation with respect thereto. The resilient retaining means preferably comprises a pair of clip members, each of which is engageable with a different opposite side extremity of a cassette port. Further, each of the clip members preferably includes an outer lip on the forward end of the second leg thereof which extends outwardly and away from the first leg thereof for engaging the front surface of the front panel of a cassette player or recorder adjacent one of the opposite extremities of the port. The clip members are preferably operable by resiliently moving the outer lips thereof inwardly and together to deflect the second legs of the clip members toward the first legs thereof in order to release the device from a cassette port. Further, each of the clip members preferably includes a detent rib on the outer side of the second leg thereof which is receivable in engagement with the rear side of the front panel of a cassette player adjacent one of the opposite side extremities of a cassette port therein for releasably retaining the clip members in the cassette port.

It has been found that the device of the instant invention can be effectively utilized for child proofing a cassette player or recorder, such as a video cassette recorder. Specifically, it has been found that the clip members of the device of the subject invention are operable for effectively releasably retaining the device in the cassette port of a video cassette recorder in a manner which enables the device to be easily removed by an adult, but not by a young child. Still more specifically, because of the manner in which the lip portions are movable inwardly and together to release the device from the cassette port, the device requires a certain amount of coordination and strength to disengage it from a cassette port. As a result, the device can be easily removed from a cassette port by an adult but it normally can not be easily removed by a young child who would normally lack sufficient manual dexterity and strength to properly manipulate the clip members. Accordingly, it is a primary object of the instant invention to provide an effective device for child proofing a cassette player or recorder, such as a video cassette recorder.

Another object of the instant invention is to provide an effective device for child proofing the cassette port of a video cassette recorder, wherein the device is releasably receivable in the cassette port in a manner which enables it to be readily removed by an adult but not by a child.

An even still further object of the instant invention is to provide an effective device for child proofing the cassette port of a video cassette recorder which includes a pair of resilient clip members for releasably engaging a pair of opposite side extremities of the cassette port in order to releasably retain the device in the cassette port.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
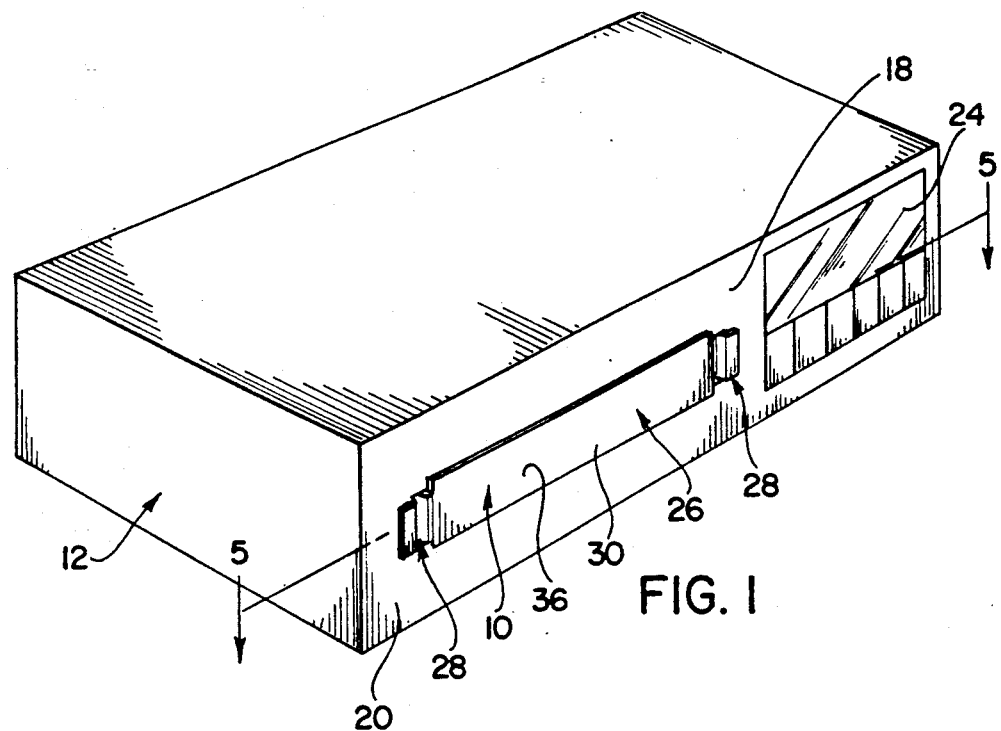
FIG. 1 is a perspective view of a video cassette recorder with the device of the instant invention installed therein.
Figure 2:
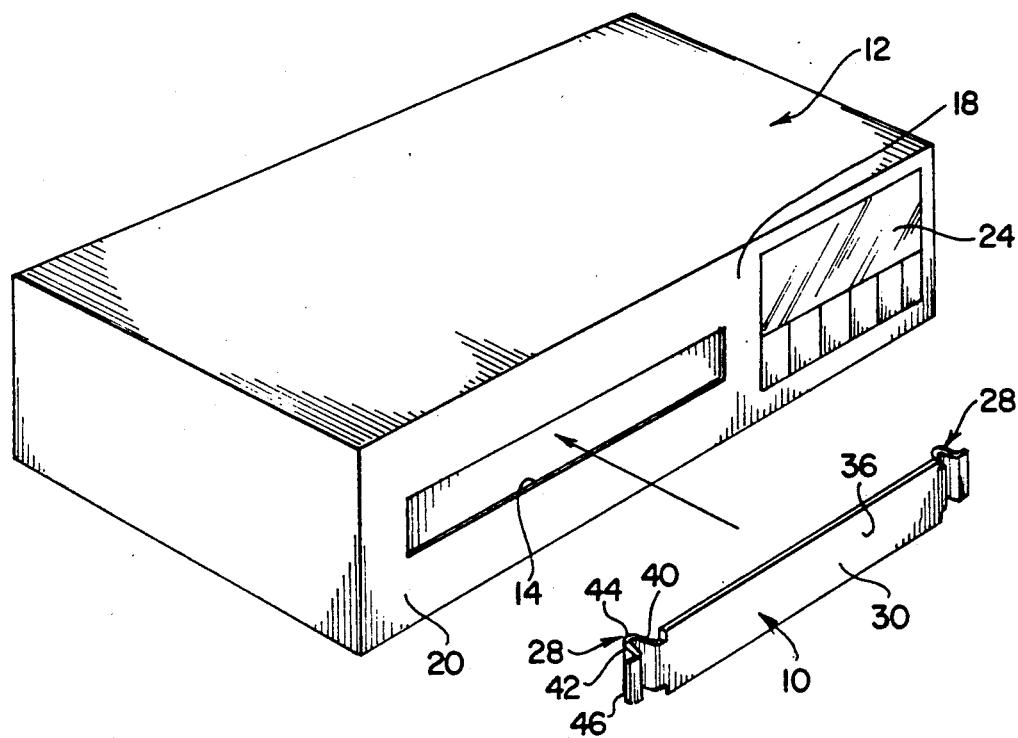
FIG. 2 is an exploded perspective view thereof.
Figure 3:
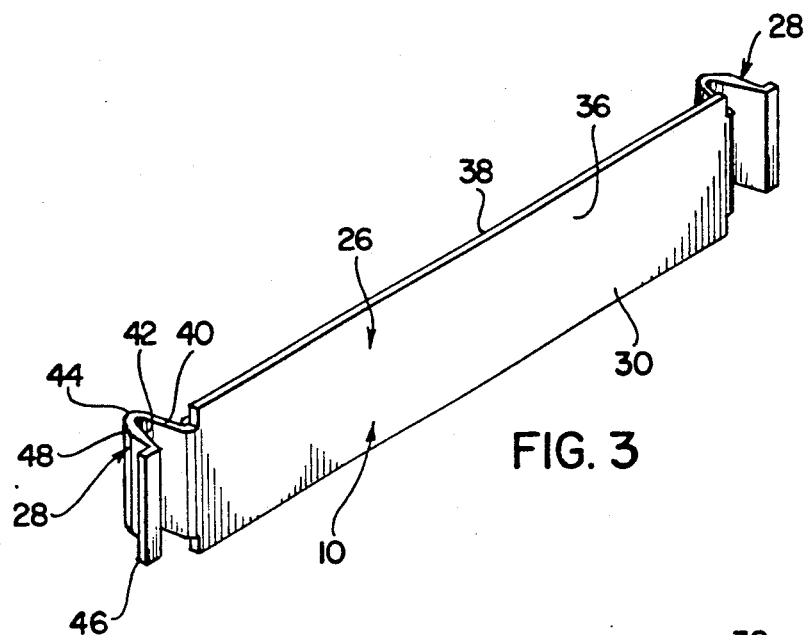
FIG. 3 is a front perspective view of the device of the instant invention.
Figure 4:
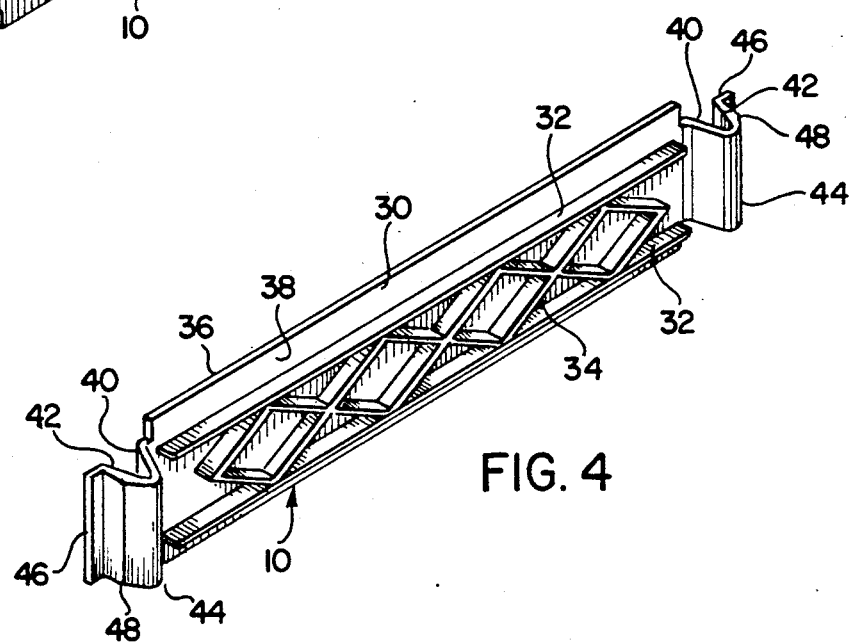
FIG. 4 is a rear perspective view thereof.
Figure 5:
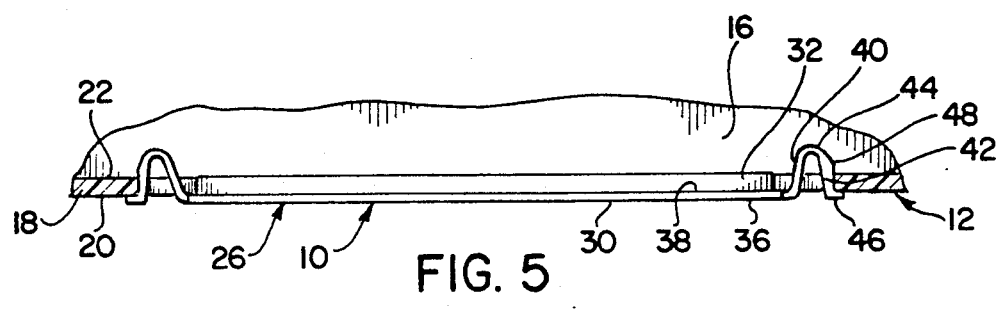
FIG. 5 is a fragmentary sectional view taken along the line 5—5 in FIG. 1.

Referring now to the drawings, the device of the instant invention is illustrated and generally indicated at 10 in FIGS. 1 through 5. The device 10 is operable in combination with a cassette player, such as a video cassette recorder, generally indicated at 12, having a cassette port 14 therein which opens into a cassette chamber 16. More specifically, the device 10 is releasably receivable in engagement in the cassette port 14 for preventing foreign objects, including articles of food and the like, from being inserted into the chamber 16 through the port 14 in order to prevent damage to the video cassette recorder 12.

The video cassette recorder 12 is of generally conventional construction and it includes a front panel 18 having front and rear sides 20 and 22, respectively, and a front control panel 24 which is operable in a conventional manner for controlling the operation of the video cassette recorder 12.

The device 10 comprises a front or obstructing plate portion generally indicated at 26, and a pair of clip members generally indicated at 28. The device 10 is receivable in the cassette port 14 so that the clip members 28 engage the opposite side extremities of the port 14 for releasably retaining the obstructing plate portion 26 in obstructing relation with respect to the port 14.

The front plate portion 26 is preferably integrally molded from a suitable plastic material and it comprises a front plate member 30, a pair of rear stiffening ribs 32, and a rear stiffening lattice 34. The front plate member 30 is of generally elongated rectangular configuration and the stiffening ribs 32 are integrally formed on the rear side of the plate member 30 so that they are spaced inwardly from the upper and lower edges thereof. The ribs 32 are further positioned so that they are spaced apart by a distance which is less than the vertical height of the port 14 to enable the ribs 32 and the stiffening lattice 34 to be inserted into the port 14. The stiffening lattice 34 is integrally formed on the rear side of the front plate member 30 between the ribs 32 for stiffening the plate portion 26.

The clip members 28 are of generally U-shaped configuration and they are preferably integrally molded from a suitable plastic material at opposite ends of the plate portion 26. Each of the clip members 28 preferably includes first and second legs 40 and 42 respectively, which are connected by a connecting portion 44. Each of the clip members 28 is preferably formed so that the first leg 40 is thereof extends rearwardly from an end of the plate portion 26 to the respective connecting portion 44 thereof and so that the second leg 42 thereof extends forwardly from the respective connecting portion 44 thereof. Each of the clip members 28 preferably further includes a lip portion 46 which extends outwardly from the forward end of the second leg 42 thereof in substantially coplanar relation with the front plate member 30 and a detent rib 48 on the outwardly facing side of the second leg 42 thereof. As illustrated most clearly in FIG. 5, the clip members 28 are receivable in the video cassette recorder port 14 so that the second legs 42 thereof are resiliently deflected inwardly toward the first legs 40 thereof and so that the outer surfaces of the second legs 42 thereof engage the opposite side extremities of the port 14. When the clip members 28 are received in the port 14 in this manner the front lip portions 46 thereof are engageable with the front surface 20 of the front panel 18 adjacent the opposite side extremities of the port 14 and the detent ribs 48 are engageable with the rear surface 22 of the front panel 18 adjacent the opposite side extremities of the port 14. Accordingly, the lip portions 46 and the detent ribs 48 cooperate to releasably position the device 10 in the port 14.

Accordingly, for use and operation of the device 10, the clip members 28 are positioned adjacent opposite side extremities of the port 14 and the device 10 is urged rearwardly so that the detent ribs 48 pass inwardly into the chamber 16. When the device 10 is assembled in the port 14 in this manner, the front lip portions 46 are engageable with the front surface 20 of the panel 18 and the detent ribs 48 are engageable with the rear surface 22 of the front panel 18. In order to thereafter remove the device 10 from the port 14 the lip portions 46 are manually moved inwardly and together to deflect the second legs 42 toward the respective first legs 40 thereof. This enables the ribs 48 to pass outwardly beyond the side extremities of the port 14. Accordingly, once the lip portions 46 have been moved inwardly and together the device 10 can be removed from the port 14 by simply moving it forwardly relative to the front panel 18.

It is seen therefore that the instant invention provides an effective device for child proofing the cassette port of a cassette recorder or cassette player. The device 10 is adapted so that it is readily and easily receivable in the cassette port 14 so that the front plate member 30 effectively obstructs the port 14. Further, the device 10 is constructed so that it is readily and easily removable from the port 14 by a adult by simultaneously urging the lip portions 46 inwardly and together to disengage the detent ribs 48 from the side extremities of the port 14. However, because the operation of moving the lip portions 46 inwardly and together requires a certain degree of strength and coordination, it normally cannot be readily performed by a young child. Hence, while the device 10 can be readily and easily removed from the port 14 by an adult, it normally cannot be easily removed by a young child. As a result, it is seen that the device 10 effectively solves the problem of providing a means for child proofing the cassette port of a cassette player or recorder. Accordingly, it is seen that the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A device for obstructing a cassette port of a cassette recorder, wherein the cassette recorder is of a type including a front panel having front and rear sides, said cassette port being formed in said front panel and opening into a cassette chamber, said cassette port being of substantially rectangular configuration and having at least one pair of opposite extremities, the areas in said chamber adjacent said opposite extremities being substantially unobstructed, said device being receivable in an assembled relation with said cassette recorder and comprising obstructing means for obstructing said cassette port when said device is received in said assembled relation with said cassette recorder and resilient retaining means resiliently engaging said opposite extremities for releasably retaining said obstructing means in obstructing relation with respect to said cassette port when said device is received in said assembled relation with said cassette recorder, said resilient retaining means comprising at least one generally U-shaped resilient clip member, said clip member having opposite first and second legs and a resiliently bendable connecting portion connecting said first and second legs, said obstructing means having front and rear sides, said first leg being attached to said obstructing means so that said clip member extends rearwardly therefrom to said connecting portion and so that said second leg extends forwardly from said connecting portion, said second leg having an outwardly facing side and being resiliently deflectable toward said first leg by resiliently bending said clip member at said connecting portion, said clip member being receivable in said cassette port so that the outwardly facing side of said second leg is in pressurized engagement with one of said opposite extremities for retaining said obstructing means in obstructing relation with respect to said cassette port.

2. In the device of claim 1, said resilient retaining means further comprising a pair of said clip members, each of said clip members being engageable with a different one of said opposite extremities.

3. In the device of claim 1, said clip member further comprising an outer lip on said second leg, said outer lip extending outwardly away from said first leg and being engageable with the front surface of said front panel adjacent one of said opposite extremities, said outer lip being manually resiliently moveable inwardly toward said obstructing means to deflect said second leg inwardly toward said first leg and to thereby release said clip member from said one of said opposite extremities.

4. In the device of claim 3, said resilient retaining means further comprising a pair of said clip members, each of said clip members including an outer lip and each being engageable with a different one of said opposite extremities.

5. In the device of claim 1, said clip member further comprising detent means on the outwardly facing side of said second leg, said detent means being receivable in engagement with the rear side of said front panel adjacent one of said opposite extremities for releasably retaining said clip member in said port.

6. In the device of claim 4, said clip member further comprising detent means on the outwardly facing side of said second leg, said detent means being receivable in engagement with the rear side of said front panel adjacent one of said opposite extremities for releasably retaining said clip member in said port.

7. In the device of claim 5, said resilient retaining means further comprising a pair of said clip members, each of said clip members being engageable with a different one of said opposite extremities.

8. In the device of claim 6, said resilient retaining means further comprising a pair of said clip members, each of said clip members being engageable with a different one of said opposite extremities.

9. In combination, a cassette recorder having a cassette port and a device for obstructing the cassette port, said cassette recorder including a front panel having front and rear sides, said cassette port being formed in said front panel and opening into a cassette chamber, said cassette port being of substantially rectangular configuration and having at least one pair of opposite extremities, the areas in said chamber adjacent said opposite extremities being substantially unobstructed, said device comprising obstructing means receivable in obstructing relation with respect to said cassette port and resilient retaining means engageable with said opposite extremities for releasably retaining said obstructing means in obstructing relation with respect to said cassette port.

10. In the combination of claim 9, said resilient retaining means comprising at least one generally U-shaped resilient clip member, said clip member having opposite first and second legs and a resilient connecting portion connecting said first and second legs, said obstructing means having front and rear sides, said first leg being attached to said obstructing means so that said clip member extends rearwardly therefrom to said connecting portion and so that said second leg extends forwardly from said connecting portion, said second leg having an outwardly facing side and being resiliently deflectable toward said first leg by resiliently bending said clip member at said connecting portion, said clip member being receivable in said cassette port so that the outwardly facing side of said second leg is in pressurized engagement with one of said opposite extremities for retaining said obstructing means in obstructing relation with respect to said cassette port.

11. In the combination of claim 10, said resilient retaining means further comprising a pair of said clip members, each of said clip members being engageable with a different one of said opposite extremities.

12. In the combination of claim 10, said clip member further comprising an outer lip on said second leg, said outer lip extending outwardly away from said first leg and being engageable with the front surface of said front panel adjacent one of said opposite extremities, said outer lip being manually resiliently moveable inwardly toward said obstructing means to deflect said second leg inwardly toward said first leg and to thereby release said clip member from said one of said opposite extremities.

13. In the combination of claim 12, said resilient retaining means further comprising a pair of said clip members, each of said clip members including an outer lip and each being engageable with a different one of said opposite extremities.

14. In the combination of claim 10, said clip member further comprising detent means on the outwardly facing side of said second leg, said detent means being receivable in engagement with the rear side of said front panel adjacent one of said opposite extremities for releasably retaining said clip member in said port.

15. In the combination of claim 13, said clip member further comprising detent means on the outwardly facing side of said second leg, said detent means being receivable in engagement with the rear side front panel adjacent one of said opposite extremities for releasably retaining said clip member in said port.

16. In the combination of claim 14, said resilient retaining means further comprising a pair of said clip members, each of said clip members being engageable with a different one of said opposite extremities.

17. In the combination of claim 15, said resilient retaining means further comprising a pair of said clip members, each of said clip members being engageable with a different one of said opposite extremities.

18. In the combination of claim 9, said resilient retaining means including an outer lip extending outwardly and away from said obstructing means and engageable with the front surface of said front panel adjacent one of said opposite extremities.

19. A device for obstructing a cassette port of a cassette recorder, wherein the cassette recorder is of a type including a front panel having front and rear sides, said cassette port being formed in said front panel and opening into a cassette chamber, said cassette port being of substantially rectangular configuration and having at least one pair of opposite extremities, the areas in said chamber adjacent said opposite extremities being substantially unobstructed, said device being receivable in an assembled relation with said cassette recorder and comprising obstructing means for obstructing said cassette port when said device is received in said assembled relation with said cassette recorder and resilient retaining means resiliently engaging said opposite extremities for releasably retaining said obstructing means in obstructing relation with respect to said cassette port when said device is received in said assembled relation with said cassette recorder, said resilient retaining means comprising an outer lip extending outwardly and away from said obstructing means and engageable with the front surface of said front panel adjacent one of said opposite extremities.

20. A method of obstructing a cassette port of a cassette recorder, wherein the cassette recorder is of a type including a front panel having front and rear sides, said cassette port being formed in said front panel and opening into a cassette chamber, said cassette port being of substantially rectangular configuration and having at least one pair of opposite extremities, the areas in said chamber adjacent said opposite extremities being substantially unobstructed, said method comprising forming a device for obstructing said cassette port, said device including an obstructing portion receivable in obstructing relation with respect to said cassette port and a pair of resilient retaining portions resiliently engageable with said opposite extremities for retaining said obstructing portion in obstructing relation with respect to said cassette port, said method further comprising assembling said device with said cassette recorder so that said obstructing portion is received in obstructing relation with respect to said cassette port and so that said resilient retaining portions are received in resilient engagement with said opposite extremities for retaining said obstructing portion in obstructing relation with respect to said port.

* * * * *